United States Patent [19]
Cobbe

[11] 3,840,719
[45] Oct. 8, 1974

[54] SPOT WELDING MACHINE
[75] Inventor: Daniel W. Cobbe, Jamestown, N.Y.
[73] Assignee: M & O Metal Products, Jamestown, N.Y.
[22] Filed: May 14, 1973
[21] Appl. No.: 360,112

[52] U.S. Cl............................ 219/80, 228/4, 228/44
[51] Int. Cl.............................................. B23k 9/12
[58] Field of Search .......... 219/80, 79, 86, 87, 102, 219/124, 88; 228/4, 44

[56] References Cited
UNITED STATES PATENTS
1,831,343    11/1931    Caldwell............................ 219/124
2,323,361    7/1943    Weightman........................... 219/80

Primary Examiner—C. L. Albritton

[57] ABSTRACT

A welding machine having a fixed frame and a carriage to support work and to move the work from side to side of the machine while it is being welded. Two electrodes are vertically and adjustably supported on the machine. They are urged toward each other by a spring. The electrodes are urged apart by a linkage and an air actuated cylinder. The electrodes are carried on an electrode carriage which is freely slidable laterally. The laterally slidable carriage is adjusted vertically by a hydraulic cylinder acting through bellcranks and links.

9 Claims, 3 Drawing Figures

PATENTED OCT 8 1974 3,840,719

3,840,719

SPOT WELDING MACHINE

OBJECTS OF THE INVENTION

It is an object of the invention to provide an improved welding machine.

Another object of the invention is to provide a welding machine that is simple in construction, economical to manufacture, and simple and efficient to use.

Yet another object of the invention is to provide a welding machine wherein the electrodes are vertically and laterally adjustable and are urged toward each other by an air cylinder.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

GENERAL DESCRIPTION OF THE DRAWINGS

DETAILED DESCRIPTION OF THE DRAWINGS

Figure 2:
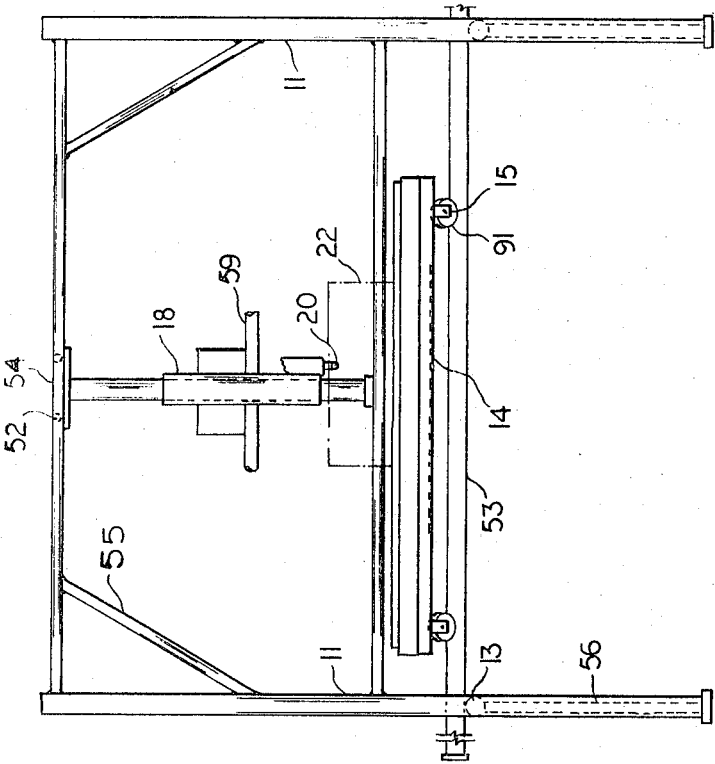
FIG. 2 is a sideview of the machine.
Figure 1:
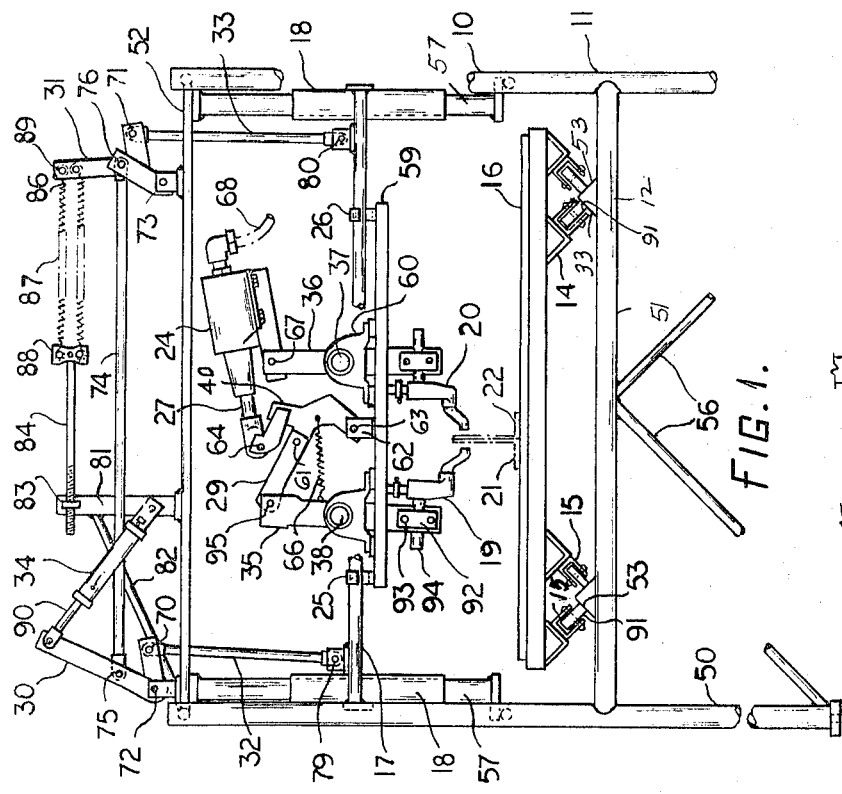
FIG. 1 is a front view of the machine according to the invention.
Figure 3:
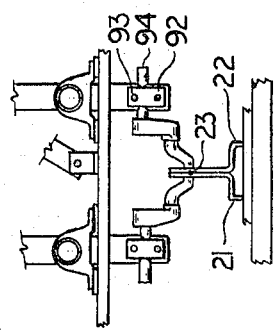
FIG. 3 is an enlarged view of the electrode and support mechanism.

Now with more particular reference to the drawings, the frame 10 has corner legs 11 held in lateral spaced relation by lateral members 51 and 52 and in longitudinal spaced relation by tracks 53 and members 54. The tracks 53 rest on members 51 and extend from one end of the machine to the other. The tracks are in the shape of inverted V-shaped angles. Cross member 54 extends longitudinally across the top and is attached to the upper ends of the legs and angle braces 55 extend upward at the upper corners and angle braces 56 brace the lower part of the machine frame.

Vertical posts 57 are supported on the corner posts 50 at their lower ends and are attached at their upper ends to the frame members 54. Sleeves 18 are slidable up and down on the vertical post 57 and the spaced laterally extending welding electrode support bars 17 are fixed to the sleeves 18. The electrode supports 17 may be in the form of round rods spaced from each other a slight distance and these rods slidably receive the bearings of slidable joints 25 and 26. Joints 25 and 26 are fixed to the electrode carriage platform 59 on which the bearing block 60 is supported. The bearing blocks 60 rotatably support the bearing members 37 and 38 which are cylindrical members fixed to the cranks 35 and 36. The member 29 is pivoted to the member 35 at 95 and is pivoted at 61 to the link 40. The link 40 is pivoted at its lower end at 62 to the lug 63 on the electrode carriage platform 59. The upper end of link 40 is pivoted at 64 to piston rod 27 of the cylinder 24. The spring 66 is connected to the link 40 and to the link 35 and urges the link 35 toward the link 40. The link 36 is fixed to the journal 38 which is in turn pivoted in the bearing 60 and the upper end of the link 36 is pivoted at 67 to the cylinder support 28. When cylinder 24 forces its piston rod 27 outward, it exerts a force directly on link 40. Because of spring 66, link 40 moves first. When link 40 moves toward link 35 this action causes a locking effect between links 35, 29 and 40 at pivots 95, 61 and 63. This locking effect holds link 35 thus electrode 19 in a rigid position. As air is continued to be supplied to cylinder 24, cylinder 24 is moved away from its piston rod 27. Cylinder 24 being pivoted at 67 pushes link away from link 35 and moves electrode 20 toward electrode 19. When the air in cylinder 24 is released, the spring moves the electrodes 19 and 20 away from each other and away from the work pieces 21 and 22, by way of the reverse of the process that brought the electrodes 19 and 20 together.

The sleeves 18 with the rods which form lateral tracks 17 supported on them can be adjusted up and down by the bellcranks 30 and 31 which are pivoted to a first link 32 and to a second link 33 at 70 and 71 respectively. The bellcranks 30 and 31 are pivoted to the lugs on the frame member 11 at 72 and 73. The bellcranks are urged to move in unison by the tie rod 74 which is pivoted at 75 to the first bellcrank 30 and at 76 to the second bellcrank 31. Links 32 and 33 are pivoted to the frame member 17 at 79 and 80 respectively. The vertical member 81 is fixed to the frame 52 and is held in place by the brace 82. A threaded member 83 holds the threaded end of the rod 84 and makes its length adjustable. The opposite end of the rod 84 is connected to tension springs 87 at 88. Springs 87 are connected to arm 31 at 89 by hooks 85. Thus the entire mechanism is counterbalanced vertically by springs 87.

The electrode carriage 59 can be adjusted vertically by extending the piston rod of cylinder 34 thereby raising or lowering the electrode support.

The work carrier 16 has wheels 91 carried on bearings 15. These wheels 91 are supported at an angle as shown and they ride on the inverted V-shaped track 53. The axles supporting the wheels are generally parallel to the sides of the tracks. Thus the carriage supported on the wheels can be moved on tracks 53 from side to side.

The electrodes are guided along the vertical flanges of work pieces 21 and 22 as the electrode carriage 59 slides on rods 17. The electrodes are urged apart by spring 66. When the electrodes reach the end of their travel, the cylinder 24 may have its air released. This allows spring 66 to swing the links 29, 35 and 40 about pivots 61, 64 and 95 which extends piston rod 27 and moves electrodes 19 and 20 away from each other.

The welding machine will be seen to comprise a frame 10, a work carriage 16, with the wheels 91 supporting the work carriage 16 on the track 53 for longitudinal movement on the frame. The electrode carriage 59 is supported for free lateral movement on the rods 17 that form lateral tracks. The electrode carriage 59 is freely movable laterally so that as the electrodes follow the flanges on the angles 21 and 22 of the work, the carriage 59 adjusts itself laterally.

The two spaced electrodes 19 and 20 are shown slidably supported on the carriage and urged away from each other by the spring 66, as explained above. The electrodes 19 and 20 are forced together when air is admitted to the cylinder 24.

Additional electrodes could obviously be provided in addition to electrodes 19 and 20 in order to provide additional weld seams on the angles 21 and 22.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A welding machine comprising a frame,
a work carrier,
means supporting said work carrier on said frame for longitudinal movement thereon,
a first electrode and a second electrode,
an electrode support on said frame,
means including resilient means supporting said electrodes on said electrode support,
air cylinder means supported on said electrode support for moving said electrodes toward and away from each other,
support means supporting said electrode support for movement laterally thereon,
and means for moving said electrode support vertically on said frame relative to said work carrier.

2. The machine recited in claim 1 wherein said means supporting said work carrier on said frame comprises wheels thereon and said wheels rest on tracks,
and said tracks extend from one end of said frame to the other end of said frame.

3. The machine recited in claim 2 wherein said tracks are V-shaped,
and said wheels are supported on axles disposed generally parallel to the sides of said V-shaped tracks.

4. The machine recited in claim 1 wherein said electrodes are supported on bearing blocks and said bearing blocks are slidably supported on said electrode support.

5. The machine recited in claim 1 wherein said electrode support comprises a platform freely slidable laterally whereby said electrodes move said track on rods and thus said electrodes can adjust themselves to slide along the side of work supported on said work support.

6. A welding machine comprising a frame,
longitudinally extending tracks supported on said frame,
a work support,
means supporting said work support on said tracks, laterally extending electrode support bars fixed to said frame above said tracks,
a platform supported on said electrode support bars and freely movable laterally thereon,
a tubular member fixed to each end of said support bars,
two laterally spaced bearing members movably supported on said platform,
an electrode fixed to each said bearing member and extending down below said platform,
cylindrical means connected between said bearing members for moving said bearing members toward each other,
spring means urging said bearing members away from each other whereby said electrodes are moved away from each other,
vertically extending post members fixed to said frame,
one said tubular member being received on each said post member,
a first link and a second link,
a first bellcrank and a second bellcrank,
said first bellcrank and said second bellcrank each being swingably connected to said frame,
the upper end of said first link being connected to said first bellcrank,
the upper end of said second link being connected to said second bellcrank,
a third link connecting said first bellcrank and said second belcrank whereby said first bellcrank and said second bellcrank move together,
a hydraulic cylinder connected to said first bellcrank for swinging said first bellcrank and said second bellcrank whereby said platform is raised and lowered to bring said electrodes to proper vertical relationship to work supported on said carriage.

7. The machine recited in claim 6 wherein one of said bellcranks has a first arm and a second arm,
said first arm being longer than said second arm,
said cylinder being connected to said longer arm, 8. The machine recited in claim 7 wherein a spring is connected to one of said bellcranks whereby said platform is counterbalanced.

9. A welding machine comprising a frame,
a work carriage means supported on said frame and adapted to support work,
an electrode carriage means supported on said frame for free lateral movement on said frame,
two spaced electrodes on said electrode carriage,
means on said frame for adjustably positioning said electrode carriage upward and downward relative to said work on said work carriage whereby said electrodes may be positioned relative to said work on said work carriage,
and pneumatic means for resiliently urging said electrodes toward each other whereby said electrodes are held in positive engagement with said work on said work carriage as said work carriage moves longitudinally on said frame relative to said electrodes.

* * * * *